United States Patent [19]
Horibe

[11] Patent Number: 5,666,335
[45] Date of Patent: Sep. 9, 1997

[54] APPARATUS AND METHOD FOR CORRECTING FOR DEFECTIVE SECTORS IN A RECORDING MEDIUM

[75] Inventor: Koji Horibe, Kasugai, Japan

[73] Assignees: Fujitsu Limited, Kawasaki; Fujitsu VSLI Limited, Kasugai, both of Japan

[21] Appl. No.: 297,237

[22] Filed: Aug. 29, 1994

[30] Foreign Application Priority Data

Sep. 2, 1993 [JP] Japan .................................. 5-218857

[51] Int. Cl.$^6$ ................................................. G11B 17/22
[52] U.S. Cl. ................... 369/32; 369/58; 369/54
[58] Field of Search ........................ 369/32, 54, 58, 369/48, 59, 275.2, 275.3; 360/48, 49, 53, 54, 72.1, 72.2

[56] References Cited

U.S. PATENT DOCUMENTS 5,241,531  8/1993  Ohno et al. ........................ 369/275.2
5,270,877 12/1993  Fukushima et al. ................ 360/48

FOREIGN PATENT DOCUMENTS 0272135  6/1988  European Pat. Off. .

*Primary Examiner*—Ali Neyzari
*Attorney, Agent, or Firm*—Greer, Burns & Crain, Ltd.

[57] ABSTRACT

Apparatus is provided that reads and writes data from and to an optical disk. The optical disk has a read-only memory area and writable memory area each including a plurality of sectors for storing data. The apparatus determines whether or not data read from one sector in the read-only memory area is in error. When the data is determined to be in error, the apparatus corrects the data in the sector using an error check and correction code. When the error in the data cannot be corrected by the ECC operation, the apparatus corrects the error and write the corrected data into a writable memory area by performing an exclusive OR operation on parity data previously stored on the optical disk and data in other sectors within the sector group having the data error.

13 Claims, 4 Drawing Sheets

APPARATUS AND METHOD FOR CORRECTING FOR DEFECTIVE SECTORS IN A RECORDING MEDIUM

BACKGROUND OF THE INVENTION

1. Field of the Invention

The present invention relates generally to an optical disk apparatus which reproduces data from a disk used as a recording medium. More particularly, this invention relates to data restoration that is executed when data contained in one or more data memory areas called a sector is damaged.

2. Description of the Related Art

Conventional optical disks, such as a laser disk, compact disk and CD-ROM are called a read-only disk. A read-only disk has a read-only memory area (hereinafter called "ROM area") where audio data, image data, code data, etc. can be stored. A writable disk is a so-called magneto-optical (MO) disk which has a writable memory area (hereinafter called "MO area"). MO area can store audio data, image data, code data, etc.

Another type of optical disk called a partial ROM utilizes a large memory capacity and has both a ROM area and an MO area on a single disk. Partial ROM disks provide an advantage when different computer operating systems (hereinafter OS's) are stored in the ROM area. Such disks ensure stable data exchange between different computer systems. There are many computer systems, which require a separate OS for each computer system used. Data exchange between computers having different OS's, generally speaking, can not occur without data conversion.

Each of the ROM and MO areas of the partial ROM has a plurality of tracks divided into data memory areas called sectors. Data stored in each sector in the ROM area can be read but cannot be overwritten. When data in the ROM area is damaged, however, it is desirable to be able to restore the data.

An optical disk apparatus, which reads or writes data from or to a partial ROM, restores data in the following manner when data in one sector, within a certain range in the ROM area, is damaged. When a read error occurs for data in one sector, the optical disk apparatus corrects the error in that sector using an error check and correction (ECC) code provided in the sector. If error correction with the ECC code cannot be accomplished completely, the optical disk apparatus restores data in the corrupt sector (hereinafter called "defective sector"). To do this the optical disk apparatus uses data in a parity block provided for each group of sectors located within a certain range (e.g., one track). Parity data, which is obtained through an exclusive OR operation of data in all the sectors in one group, is stored in the parity block. To restore data in a defective sector, the optical disk apparatus performs an exclusive OR operation on data in all the sectors in a sector group in question, excluding the defective sector, and stores the parity data in the parity block.

To restore data in a defective sector when error correction protocol via an ECC code has failed, however, this conventional optical disk apparatus cannot restore more than one piece of data in the defective sector. If there are two or more defective sectors in one sector group, the conventional optical disk apparatus can restore data in one of the defective sectors using the parity data but cannot restore data in the other defective sector. This limitation in error correction protocol reduces the error correction performance and impairs the general usage of the optical disk despite its advantage of having large memory capacity. This reduces the value of optical disks.

SUMMARY OF THE INVENTION

Accordingly, it is a primary objective of the present invention to provide an optical disk apparatus which restores data in all defective sectors even where a plurality of defective sectors are present in a single sector group.

To achieve the foregoing and other objects and in accordance with the purpose of the present invention, there is provided an improved optical disk apparatus that writes data on a recording medium and reads data therefrom. The recording medium has a read-only memory area and writable memory area. Each area includes a plurality of sectors in which data is stored. The apparatus of this invention reads data from one sector in the read-only memory area and determines whether or not the read data contains any errors. When read data is determined to be in error, the apparatus performs error correction on the data in one sector using an error check and correction code. When the error in the data cannot be corrected, the apparatus performs an exclusive OR operation on parity data previously stored on the recording medium and data in other sectors in an associated sector group to which the one sector having erroneous data belongs. The apparatus in this way restores erroneous data as correct data. The apparatus writes correctly restored sector data into the writable memory area on the recording medium.

According to the apparatus of this invention, every time damaged data in a sector is restored, the restored data is written to the writable memory area. Even if data in two or more sectors of the read-only memory area are damaged, every restored data is saved in the writable memory area. This apparatus can perform data reading based on the restored data recorded in the writable memory area. The apparatus can continue the data restoring process based on the restored data and data recorded in the undamaged sectors located in the read-only memory area.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

An optical disk apparatus according to one embodiment of the present invention will now be described referring to the accompanying drawings.

Figure 1:
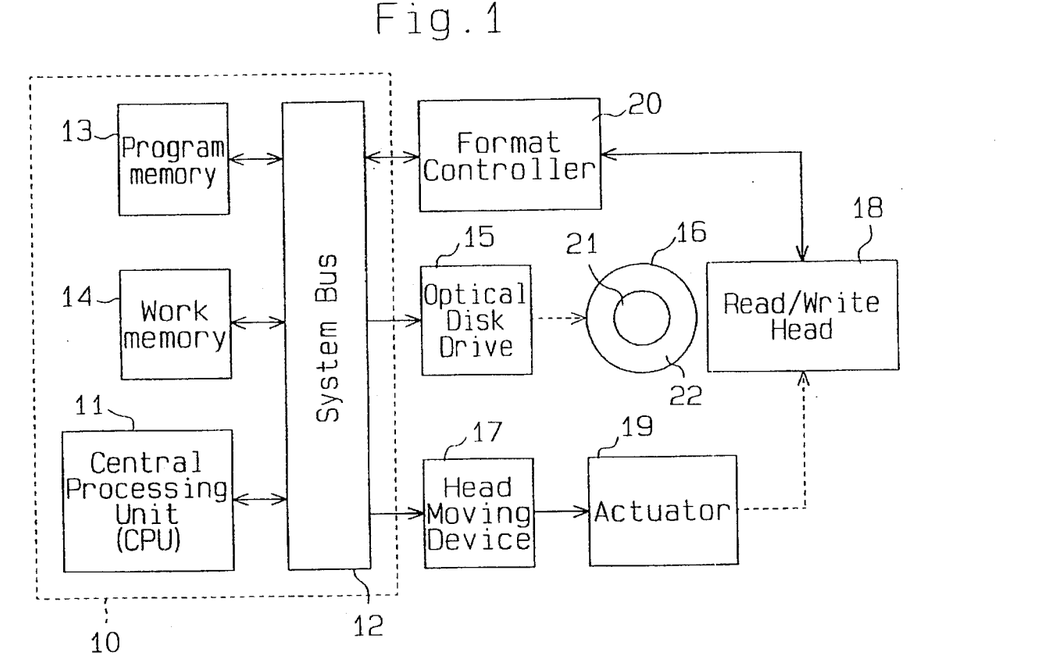
FIG. 1 is a block diagram illustrating an optical disk apparatus according to one embodiment of the present invention.

As shown in FIG. 1, the optical disk apparatus includes a read/write controller 10, an optical disk drive 15, a head moving device 17, a read/write head 18, an actuator 19 and a format controller 20. The read/write controller 10 has a central processing unit (CPU) 11, a system bus 12, a control program memory 13 and a rewritable work memory 14.

The system bus 12 connects the CPU 11, control program memory 13, work memory 14, optical disk drive 15, head moving device 17 and format controller 20. The CPU 11 operates in accordance with control programs stored in the control program memory 13, and the results of an operation performed by the CPU 11 are temporarily stored in the work memory 14. The optical disk drive 15 rotates an optical disk 16 based on a control signal from the CPU 11.

The head moving device 17 controls the actuator 19 to reciprocate the read/write head 18 in the radial direction of the disk 16 based on a control signal from the CPU 11. When driven by the actuator 19, the read/write head 18 moves to a predetermined read position or a predetermined write position on the optical disk 16 from a standby position. The format controller 20 reproduces (reads) data, recorded on the optical disk 16, via the read/write head 18, based on a control signal from the CPU 11. The format controller 20 also writes data in a predetermined memory area 22 on the optical disk 16 via the read/write head 18, based on a control signal from the CPU 11.

Figure 2:
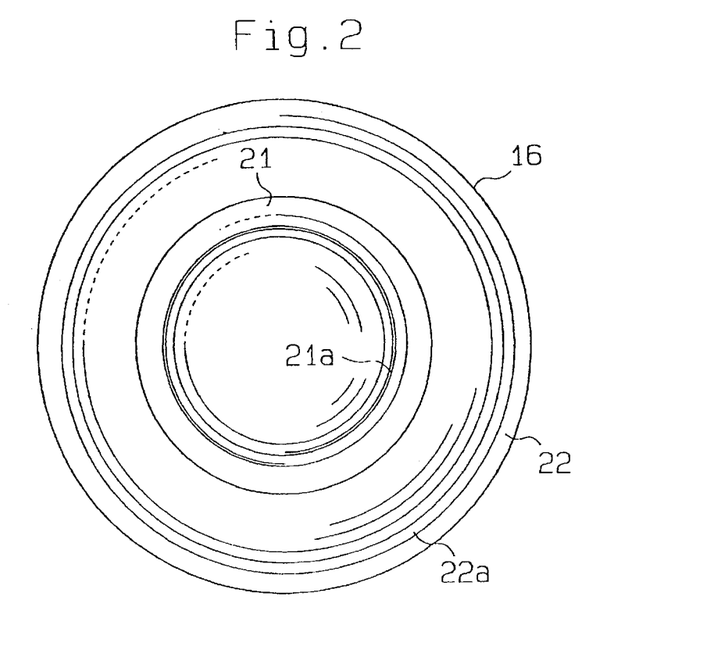
FIG. 2 is a diagram showing a read-only memory area and a writable memory area on an optical disk.

The optical disk 16 is a magneto-optical disk, which has a ROM area 21 provided on the center side and a MO area 22 provided around of the ROM area 21, as shown in FIG. 2. While an optical disk whose memory area is entirely a ROM area is called a full ROM, the optical disk 16 which has two memory areas as in this embodiment is called a partial ROM.

Figure 3:
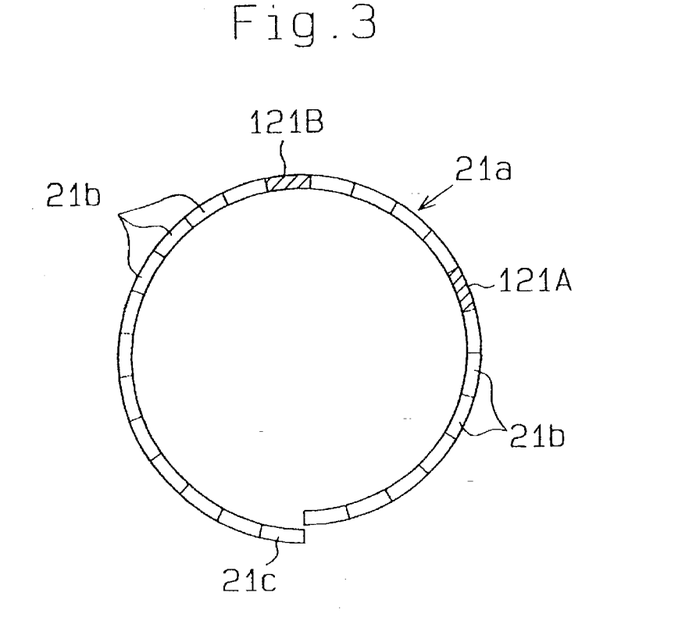
FIG. 3 is a diagram showing sectors on one track formed in the read-only memory area on the optical disk.

As illustrated in FIG. 2, data is recorded in spiral form in the ROM area 21, one turn of the spiral forming one track 21a. In this embodiment, one track 21a is divided to 25 sectors 21b as shown in FIG. 3 so that data is readable sector by sector. Each sector 21b has an ID portion and a data portion. Various addresses associated with the track number and the sector number of that sector 21b are recorded in the ID portion of the sector 21b. An error check and correction (ECC) code is recorded in addition to ordinary data in the data portion of the sector 21b.

One of the 25 sectors 21b on each track 21a is used as a parity block 21c where parity data is recorded. The parity data is obtained through an exclusive OR (EOR) operation on data of the entire 25 sectors 21b on one track 21a. If data in one sector 21b among the entire sectors 21b belonging to the track 21a is damaged and the damaged data cannot be corrected even by error correction using the ECC code, the parity data is then used to restore the damaged data. More specifically, damaged data in any sector (this sector will hereinafter be referred to as "defective sector") 21b is restored by performing an EOR operation on the parity data stored in the parity block 21c together with the entire data in the remaining twenty-three sectors 21b in the sector group to which the defective sector 21b belongs.

Figure 4:
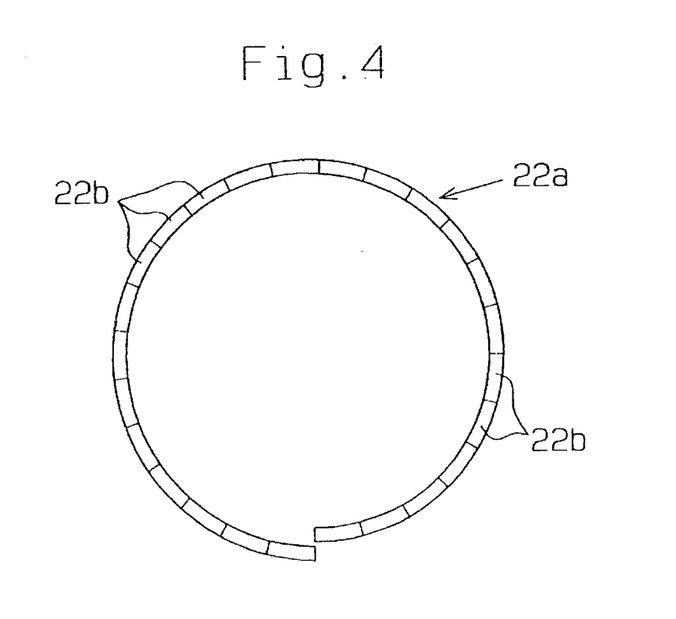
FIG. 4 is a diagram showing sectors on one track formed in the writable memory area on the optical disk.

As shown in FIG. 2, data is also recorded in spiral form in the MO area 22, where one turn of the spiral forms one track 22a. In this embodiment, one track 22a is divided to 25 sectors 22b as shown in FIG. 4 so that data is readable and writable sector by sector.

The CPU 11 reads data from each sector 21b on each track 21a on the optical disk 16 via the read/write head 18 and the format controller 20, and performs error correction and data restoration. The CPU 11 Checks if the read data in one sector 21b contains any errors by using the ECC code. If the data in that sector 21b is error free, the CPU 11 determines that this data in the sector 21b is accurate and outputs the data to an external computer (not shown) via the system bus 12. If the CPU 11 identifies corrupt data in that sector and can restore corrected data error using the ECC code, then the CPU 11 outputs the sector data, corrected through the ECC process, to the external computer.

If there is sector data which cannot be corrected through the ECC process, the CPU 11 performs data restoration using the parity data. The CPU 11 reads the parity data in the parity block 21c on the track 21a to which the defective sector 21b belongs and data in all the remaining sectors on that track 21a excluding the defective sector 21b. Then, the CPU 11 performs an EOR operation on the parity data and the correct sector data to restore the data located in the defective sector 21b. The CPU 11 then outputs the restored and corrected data to the external computer. The CPU 11 also writes the restored data, as new data, into a predetermined sector 22b on a predetermined track 22a in the MO area 22 via the format controller 20 and read/write head 18.

In this case, the CPU 11 determines a substitute track 22a for storing the restored data in association with each track 21a in this embodiment. The CPU 11 then sequentially writes the restored data in each sector 22b on the determined substitute track 22a in the order from smaller to larger sector numbers. The CPU 11 affixes data about the track number of the substitute track 22a as well as data about the sector number of the sector 22b to the restored data; both the track number data and sector number data are written in the ID portion of the sector 22b. In writing restored data to the optical disk 16, the CPU 11 writes data about the sector number of the defective sector 21b and data about the sector number of the sector 22b where the restored data should be written, as substitute sector information, into a predetermined sector 22b on a predetermined track 22a. This sector 22b is different from the substitute track 22a in the MO area 22 where the restored data is written.

Based on the substitute sector information, the CPU 11 reads data restored from the predetermined sector 22b on the predetermined substitute track 22a located in the MO area 22. The CPU 11, however, will not read the corrupt data from the defective sector 21b. The CPU 11 starts data reading operations when the external computer inputs instructions to read a particular sector and track in the ROM area 21 on the rotating optical disk 16. First, the CPU 11 computes the position of the track 21a on the optical disk 16 or the position where the read/write head 18 should be moved, based on the read instruction from the external computer. Based on the computation result, the CPU 11 controls the head moving device 17 and the actuator 19 to move the read/write head 18 to the read position.

When the read/write head 18 reads data from each sector 21b on the predetermined track 21a in the ROM area 21 on the optical disk 16, the CPU 11 temporarily stores the data in each sector 21b on that track 21a into the work memory 14. Subsequently, the CPU 11 checks if the data read from each sector 21b is in error. If there is no data error, the CPU 11 outputs the data read from that sector 21b to the external computer. If there was an error and error correction with the ECC code was successful, the CPU 11 outputs the corrected data to the external computer.

If a particular sector contains damaged data which cannot be corrected with the ECC code, as for example sector 121A shown in FIG. 3, the CPU 11 performs an EOR operation on the parity data in the parity block 21c, and the data in all the remaining sectors on track 21a excluding the defective sector 121A. The CPU 11 in this way restores the damaged data in the defective sector 121A to correct data. The CPU 11 then sends the restored data to the external computer.

The CPU 11 next identifies the predetermined sector 22b on the predetermined track 22a provided in the MO area 22 where the restored data is to be recorded. Then, the CPU 11 computes the position on the track 22a on the optical disk 16 which is associated with that sector 22b or the position (i.e., the write position) to which the read/write head 18 moves. Following this, the CPU 11 prepares substitute sector information which includes data about the sector number of the sector 22b where the restored data is written as well as data about the sector number of the defective sector 21b. The CPU 11 then determines a track 22a and a sector 22b where the substitute sector information is to be recorded.

Next, the CPU 11 controls the head moving device 17 and the actuator 19 to move the read/write head 18 to the write position for the restored data and the write position for the substitute sector information. When the read/write head 18 is moved to the predetermined track 22a, the CPU 11 sequentially writes the restored data and the substitute sector information in the predetermined sector 22b, and terminates data reading from each sector 21b on the track 21a.

When an instruction to read data from the defective sector 121A is issued again, the CPU 11 does not read the corrupt data in the defective sector 121A, but reads data, which has previously been recorded as restored data, from the predetermined sector 22b in the MO area 22. This restored data is read out by the read/write head 18 moved by the CPU 11 based on the substitute sector information. Therefore, the CPU 11 need not perform a restoration process again, thus shortening the data reading time of the CPU 11. Further, the CPU 11 easily and surely accomplishes the reading of restored data.

If data in another sector 121B on the same track 21a is newly damaged, the CPU 11 once again performs data restoration. At this time, the CPU 11 uses the restored data recorded in the sector 22b in the MO area 22 as the data in the first defective sector 121A in the other sectors 21b excluding the newly-found second defective sector 121B. After restoring the data in the second defective sector 121B, the CPU 11 outputs it to the external computer, determines a predetermined sector 22b on track 22a in which to write the newly restored data, and then writes the data in the sector 22b.

According to the present invention, even if two defective sectors 121A and 121B exist on one track 21a, the restored data will be recorded in predetermined sectors 22b on predetermined tracks 22a in the MO area 22. Even when data corruption occurs in a plurality of sectors, therefore, the optical disk apparatus embodying the present invention can always read correct data from the optical disk 16, thus ensuring the effective use of the optical disk.

When second and third defective sectors 21a are newly found, the CPU 11 records each restored data in the associated predetermined sector 22b in the MO area 22. The improved data restoring ratio on an optical disk having a large recording capacity reduces the possibility of making data reading from the disk difficult due to data corruption in a sector, thus improving the economical usage and general usage of optical disks.

Although only one embodiment of the present invention has been described herein, it should be apparent to those skilled in the art that the present invention may be embodied in many other specific forms without departing from the spirit or scope of the invention. Particularly, it should be understood that this invention may be embodied in the following modes.

Figure 5:
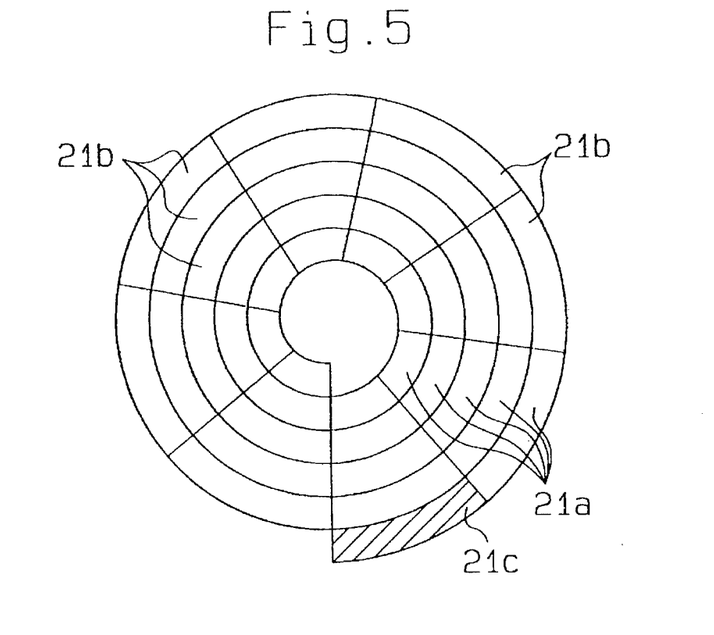
FIG. 5 is a diagram showing another example of a parity block formed in the read-only memory area on the optical disk.

The present invention may be applied to an optical disk having only one parity block 21c provided for all the sectors 21b on all the tracks 21a as shown in FIG. 5. With only one parity block 21c allocated in the ROM area 21, the amount of data storable on this optical disk increases accordingly.

Figure 6:
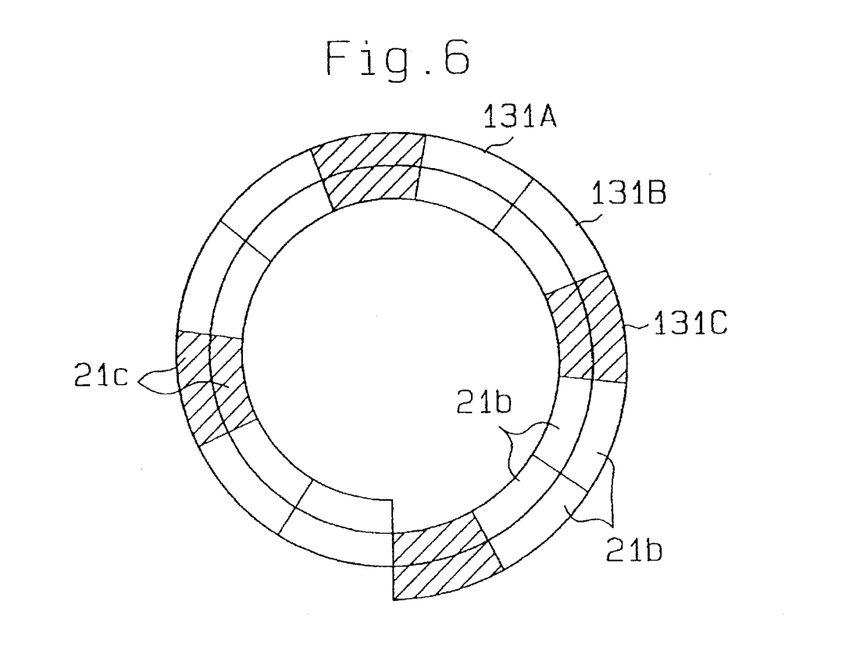
FIG. 6 is a diagram showing a further example of a parity block formed in the read-only memory area on the optical disk.

This invention may be applied to an optical disk which includes a plurality of tracks 21b on each of which groups of three sectors, are alternately arranged. This three sector arrangement is shown in FIG. 6 with sectors 131A, 131B and sector 131B as a parity block. In this case, the probability that sectors in the same sector group (sectors 131A and 131B) in the ROM area 21 will be damaged at the same time is fairly low. The success of data restoration, therefore, is fairly high. The number of sectors 21b for one parity block 21c may be changed as needed, as well as number of sectors on any given track.

The parity data in the parity block 21c and data, obtained by performing an EOR operation on data of the entire sectors 21b excluding the defective sector 121A, may be subjected to a further EOR operation to correct any damaged data that may exist in the defective sector 121A.

Figure 7:
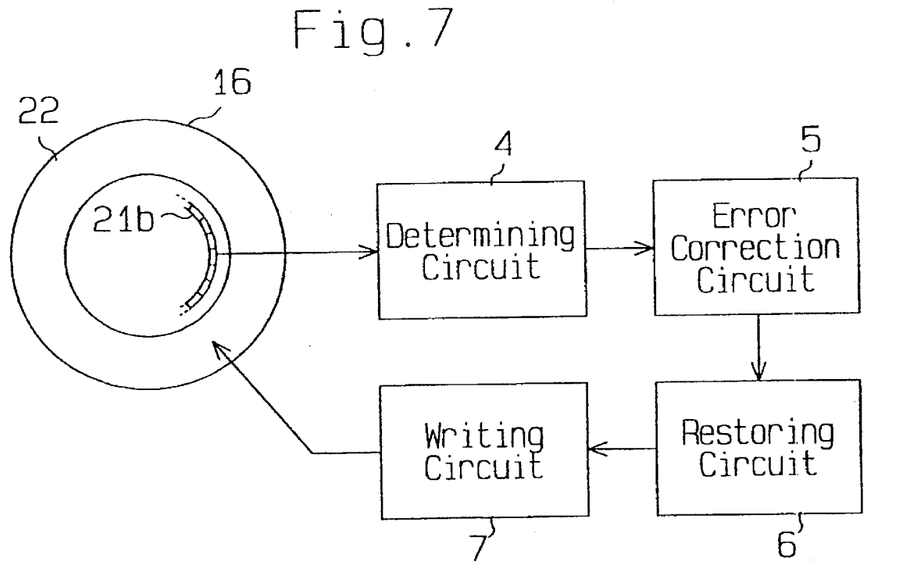
FIG. 7 is a block diagram illustrating ideal design of the present invention.

FIG. 7 is a schematic block diagram showing circuits which are incorporated in the disk apparatus of the above described embodiment and are separated in accordance with their functions. According to the present invention, it should be understood that:

the read/write head 18, format controller 20, CPU 11, control program memory 13 and work memory 14 form a determining circuit 4 for determining whether or not data of sector 21b contains an error;

the CPU 11 and memories 13 and 14 form an error correction circuit 5 for performing correction on erroneous data in one sector using an error check and correction code, and also form a restoring circuit 6 for restoring the erroneous sector data that cannot be corrected by the error correction circuit 5, as correct data; and the read/write head 18, format controller 20, CPU 11 and memories 13 and 14 form a writing circuit 7 for writing the correctly restored data into the writable memory area (i.e., MO area 22).

Therefore, the present examples and embodiment are to be considered as illustrative and not restrictive and the invention is not to be limited to the details given herein, but may be modified within the scope of the appended claims.

What is claimed is:

1. An apparatus for writing data on a recording medium and reading data therefrom, the recording medium having a read-only memory area and writable memory area each including a plurality of sectors in which data is stored, the apparatus comprising:

determining means for reading data from a first sector in said read-only memory area and for determining whether or not said read data contains an error;

error correction means for performing error correction on data in said first sector using an error check and correction code when said read data is determined to contain an error;

restoring means for performing an exclusive OR operation on parity data previously stored on the recording medium and data in other sectors in an associated sector group to which said first sector having said erroneous data belongs, thereby restoring said erroneous data as correct data, when said error in said data in said first sector cannot be corrected by said error correction means; and write means for writing said correctly restored data by said restoring means into the writable memory area on the recording medium, wherein said write means writes both data about a sector position in the writable memory area where the data restored by said restoring means is written and data about the sector number of the sector containing data in error, in a sector different from said sector in which said restored data is written, wherein when erroneous data in a second sector in said associated sector group cannot be corrected by said error correction means, said restoring means restores said erroneous data in said second sector by using said correctly restored first sector data stored in the writable memory area.

2. A method for writing data on a recording medium and reading data therefrom, the recording medium having a read-only memory area and writable memory area each including a plurality of sectors in which data is stored, the method comprising the steps of:

reading data from a first sector in the read-only memory area;

determining whether or not said read data contains an error;

performing error correction on data in said first sector using an error check and correction code when said read data is determined to contain an error;

performing an exclusive OR operation on parity data previously stored on the recording medium and data in other sectors in an associated sector group to which said first sector having said erroneous data belongs, thereby restoring said erroneous data as correct data, when said error in said data in said first sector cannot be corrected in said error correction step; and writing and said correctly restored data in the writable memory area on the recording medium, wherein when erroneous data in a second sector in said associated sector group cannot be corrected in said error correction step, said erroneous data in said second sector is restored by the utilization of said correctly restored first sector data stored in the writable memory area in said exclusive OR operation step, and writing both data about a sector position where the restored data is written and data about the sector number of the sector containing data in error in a sector different from said sector in which said restored data is written.

3. An apparatus for writing data on an optical disk and reading data therefrom, the optical disk having a read-only memory area located at its center portion and writable memory area located around said read-only memory area, each including a plurality of sectors in which data is stored, the apparatus comprising:

determining means for reading data from a first sector in said read-only memory area and for determining whether or not said read data contains an error;

error correction means for performing error correction on data in said first sector using an error check and correction code when said read data is determined to contain an error;

restoring means for performing an exclusive OR operation on parity data previously stored on the recording medium and data in other sectors in an associated sector group to which said one sector having said erroneous data belongs, thereby restoring said erroneous data as correct data, when said error in said data in said sector cannot be corrected by said error correction means;

means for supplying said correctly restored data, which is stored in the writable memory area, to said restoring means so that said restoring means utilizes its correctly restored data, instead of said data in said other sectors in said associated sector group, during the exclusive OR operation; and write means for writing said correctly restored data by said restoring means into the writable memory area on the recording medium.

4. An apparatus for writing data on a recording medium and reading data therefrom, the recording medium having a read-only memory area and writable memory area each including a plurality of sectors in which data is stored, the apparatus comprising:

determining means for reading data from one sector in said read-only memory area and for determining whether or not said read data contains an error;

error correction means for performing error correction on data in said one sector using an error check and correction code when said read data is determined to contain an error;

restoring means for performing an exclusive OR operation on parity data previously stored on the recording medium and data in other sectors in an associated sector group to which said one sector having said erroneous data belongs, thereby restoring said erroneous data as correct data, when said error in said data in said sector cannot be corrected by said error correction means;

write means for writing said correctly restored data by said restoring means into the writable memory area on the recording medium;

wherein said write means writes both data about a sector position in the writable memory area where the restored data by said restoring means is written and data about the sector number of the sector containing data in error, in a sector different from said sector in which said restored data is written.

5. The apparatus according to claim 4, wherein said recording medium is an optical disk which has a read-only memory area located at its center portion and a writable memory area located around said read-only memory area.

6. An apparatus for writing data on a recording medium and reading data therefrom, the recording medium being an optical disk which has a read-only memory area located at its center portion and a writable memory area located around said read-only memory area, the apparatus comprising:

determining means for reading data from one sector in said read-only memory area and for determining whether or not said read data contains an error;

error correction means for performing error correction on data in said one sector using an error check and correction code when said read data is determined to contain an error;

restoring means for performing an exclusive OR operation on parity data previously stored on the recording medium and data in other sectors in an associated sector group to which said one sector having said erroneous data belongs, thereby restoring said erroneous data as correct data, when said error in said data in said sector cannot be corrected by said error correction means; and write means for writing said correctly restored data by said restoring means into the writable memory area on the recording medium;

wherein said read-only memory area provided on said optical disk has a plurality of tracks formed in spiral form and having a plurality of sectors, one of said sectors on each track being assigned as a parity block for recording parity data, and wherein said writable memory area provided on said optical disk has a plurality of tracks formed in spiral form and having a plurality of sectors, some of which are assigned as sectors for recording restored data.

7. The apparatus according to claim 6, wherein said restoring means performs an exclusive OR operation using said parity data in said parity block on a track to which a defective sector containing data in error belongs, and data of remaining sectors in an associated sector group to which said defective sector belongs.

8. A method for writing data on a recording medium and reading data therefrom, the recording medium having a read-only memory area and writable memory area each including a plurality of sectors in which data is stored, the method comprising the steps of:

reading data from one sector in the read-only memory area;

determining whether or not said read data contains an error;

performing error correction on data in said one sector using an error check and correction code when said read data is determined to contain an error;

performing an exclusive OR operation on parity data previously stored on the recording medium and data in other sectors in an associated sector group to which said one sector having said erroneous data belongs, thereby restoring said erroneous data as correct data, when said error in said data in said sector cannot be corrected in said error correction step;

writing said correctly restored data into the writable memory area on the recording medium;

wherein in said writing step, both data about a sector position in the writable memory area where the restored data is written and data about the sector number of the sector containing data in error are written in a sector different from said sector in which said restored data is written.

9. An apparatus for writing data on a recording medium and reading data therefrom, the recording medium being an optical disk which has a read-only memory area located at its center portion and a writable memory area located around said read-only memory area, each including a plurality of sectors in which data is stored, the apparatus comprising:

determining means for reading data from a first sector in said read-only memory area and for determining whether or not said read data contains an error;

error correction means for performing error correction on data in said first sector using an error check and correction code when said read data is determined to contain an error;

restoring means for performing an exclusive OR operation on parity data previously stored on the recording medium and data in other sectors in an associated sector group to which said first sector having said erroneous data belongs, thereby restoring said erroneous data as correct data, when said error in said data in said first sector cannot be corrected by said error correction means; and write means for writing said correctly restored data by said restoring means into the writable memory area on the recording medium;

wherein when erroneous data in a second sector in said associated sector group cannot be corrected by said error correction means, said restoring means restores said erroneous data in said second sector by using said correctly restored first sector data stored in the writable memory area.

10. The apparatus according to claim 9, wherein said read-only memory area provided on said optical disk has a plurality of tracks formed in spiral form and having a plurality of sectors, one of said sectors on each track being assigned as a parity block for recording parity data, and wherein said writable memory area provided on said optical disk has a plurality of tracks formed in spiral form and having a plurality of sectors, some of which are assigned as sectors for recording restored data.

11. The apparatus according to claim 10, wherein said restoring means performs an exclusive OR operation using said parity data in said parity block on a track to which a defective sector containing data in error belongs, and data of remaining sectors in an associated sector group to which said defective sector belongs.

12. An apparatus for writing data on a recording medium and reading data therefrom, the recording medium having a read-only memory area and writable memory area each including a plurality of sectors in which data is stored, the apparatus comprising:

determining means for reading data from a first sector in said read-only memory area and for determining whether or not said read data contains an error;

error correction means for performing error correction on data in said first sector using an error check and correction code when said read data is determined to contain an error;

restoring means for performing an exclusive OR operation on parity data previously stored on the recording medium and data in other sectors in an associated sector group to which said first sector having said erroneous data belongs, thereby restoring said erroneous data as correct data, when said error in said data in said sector cannot be corrected by said error correction means;

write means for writing said correctly restored data by said restoring means into the writable memory area on the recording medium;

means for supplying said correctly restored data, which is stored in said writable memory area, to said restoring means when erroneous data in a second sector in said associated sector group to which said first sector belongs cannot be corrected by said error correction means;

wherein said restoring means receives said correctly stored data in said first sector from said supplying means and performs the exclusive OR operation to restore said erroneous data in said second sector by using said correctly restored data in said first sector.

13. A method for writing data on a recording medium and reading data therefrom, the recording medium having a read-only memory area and writable memory area each including a plurality of sectors in which data is stored, the method comprising the steps of:

reading data from a first sector in the read-only memory area;

determining whether or not said read data contains an error;

performing error correction on data in said first sector using an error check and correction code when said read data is determined to contain an error;

performing an exclusive OR operation on parity data previously stored on the recording medium and data in other sectors in an associated sector group to which said first sector having said erroneous data belongs, thereby restoring said erroneous data as correct data, when said error in said data in said first sector cannot be corrected in said error correction step;

writing said correctly restored data into the writable memory area on the recording medium; and providing said correctly restored data for said exclusive OR operation, when erroneous data in a second sector in said associated sector group to which said first sector belongs cannot be corrected in said correction step, thereby restoring said erroneous data in said second sector by the utilization of said correctly restored data in said first sector in said exclusive OR operation step.

* * * * *

UNITED STATES PATENT AND TRADEMARK OFFICE
CERTIFICATE OF CORRECTION

PATENT NO. : 5,666,335
DATED : Sept. 9, 1997
INVENTOR(S) : Koji Horibe

It is certified that error appears in the above-indentified patent and that said Letters Patent is hereby corrected as shown below:

On the Title Page

Under "[73] Assignees:" delete "VSLI" and insert --VLSI-- therefor.

Column 6, line 13, delete "131B" and insert --131C-- therefor.

Signed and Sealed this

Tenth Day of November 1998

Attest:

BRUCE LEHMAN

*Attesting Officer*        *Commissioner of Patents and Trademarks*